United States Patent [19]
Baker

[11] Patent Number: 5,853,655
[45] Date of Patent: Dec. 29, 1998

[54] MAGNETIC WHEEL GUIDED CARRIAGE WITH POSITIONING ARM

[76] Inventor: Ronald Glenn Baker, 531 S. 38th, Apt. 36, West Richland, Wash. 99353

[21] Appl. No.: 747,020

[22] Filed: Nov. 7, 1996

[51] Int. Cl.⁶ ..................................................... C21B 13/00
[52] U.S. Cl. ................................ 266/44; 266/56; 266/73; 266/67; 228/7; 228/45
[58] Field of Search ................................. 266/56, 67, 73, 266/44; 228/7, 45; 219/202

[56] References Cited

U.S. PATENT DOCUMENTS

| | | | |
|---|---|---|---|
| 3,764,777 | 10/1973 | Sakabe et al. | 228/45 |
| 4,014,528 | 3/1977 | Sugiyama | 266/66 |
| 4,131,783 | 12/1978 | Kensrue et al. | 219/124.31 |
| 4,288,020 | 9/1981 | Searles et al. | 228/7 |
| 4,457,382 | 7/1984 | Tolanda et al. | 219/124.31 |
| 5,265,849 | 11/1993 | Yamashita | 266/77 |
| 5,332,143 | 7/1994 | Furukawa et al. | 228/8 |

*Primary Examiner*—John Sheehan
*Attorney, Agent, or Firm*—Floyd E. Ivey

[57] ABSTRACT

A remote controlled welding and cutting carriage, with an automated positioning arm, to facilitate welding and cutting of flat and curved surfaces including plate and pipe without the use of track, band or similar carriage positioning or guidance mechanisms. Multiple motor driven precision ground magnetic wheel sets align and propel the carriage across a surface. Precision maintenance of magnetic wheel position is facilitated by use of spring steel axles which resist distortion from impacts. A separate magnetic wheel set alignment adjustment is provided to correct magnetic wheel set positioning. The system of motor driven magnetic wheel sets permits the carriage, or carriages, to transport cutting and welding materials required for welding and cutting around the complete circumference of a pipe or other surface regardless of orientation or slope. One or a plurality of motor driven torch positioning arms with photo sensors will track patterns delineated, for example, with a reflective tape or guidance line for additional accuracy in the positioning of the torch or welding head. The torch positioning arm may additionally be positioned, for simple as well as complex patterns, by computer and computer program guidance. Multiple welding heads or cutting torches may be positioned via the manual or automated positioning arm and carriage. A variety of transmission devices including chain and gear, worm gears, and reduction gears are powered by a power source including electrical motors, including variable speed electrical motors, to rotate the magnetic wheel sets. Travel speed of the carriage may be varied.

22 Claims, 19 Drawing Sheets

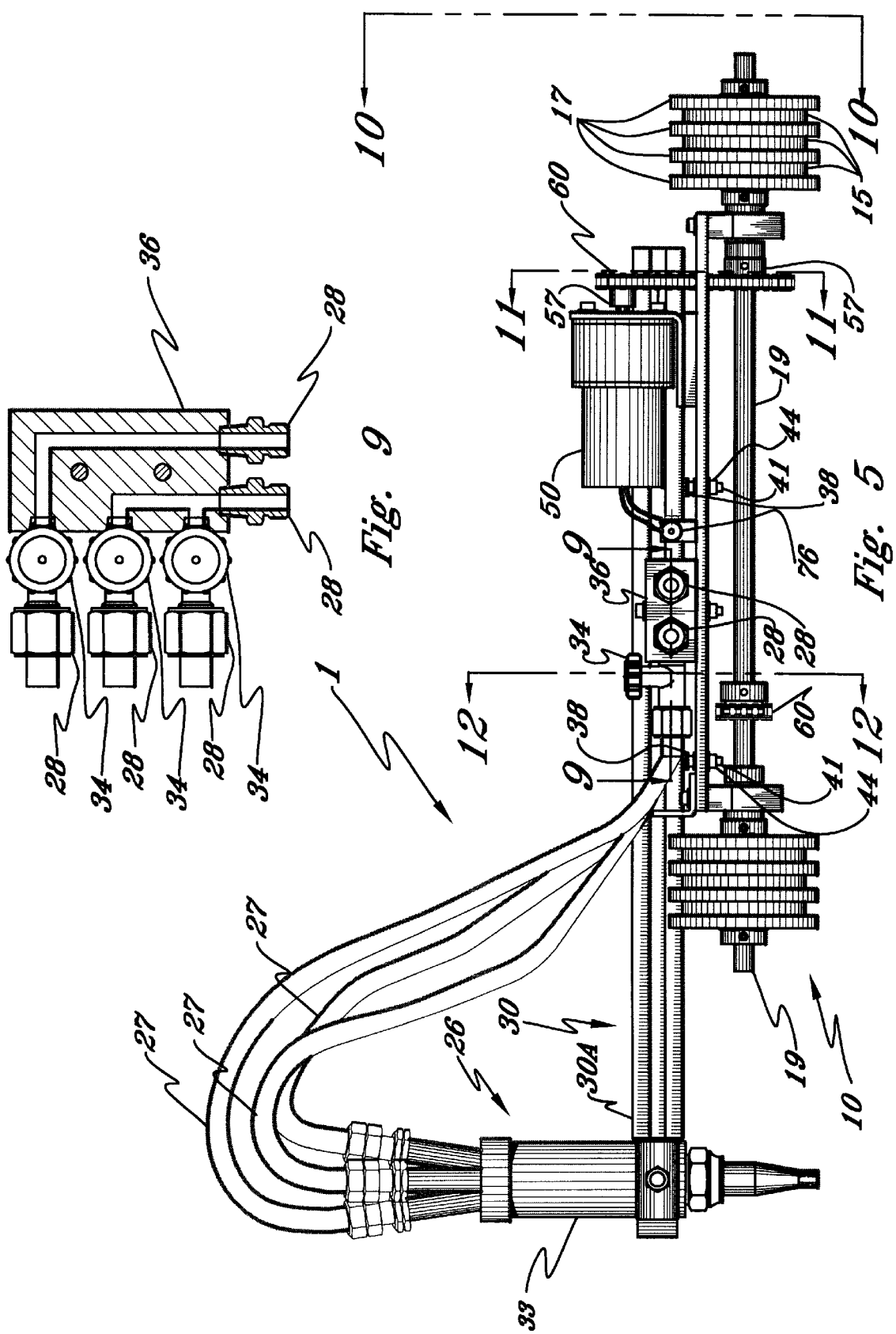

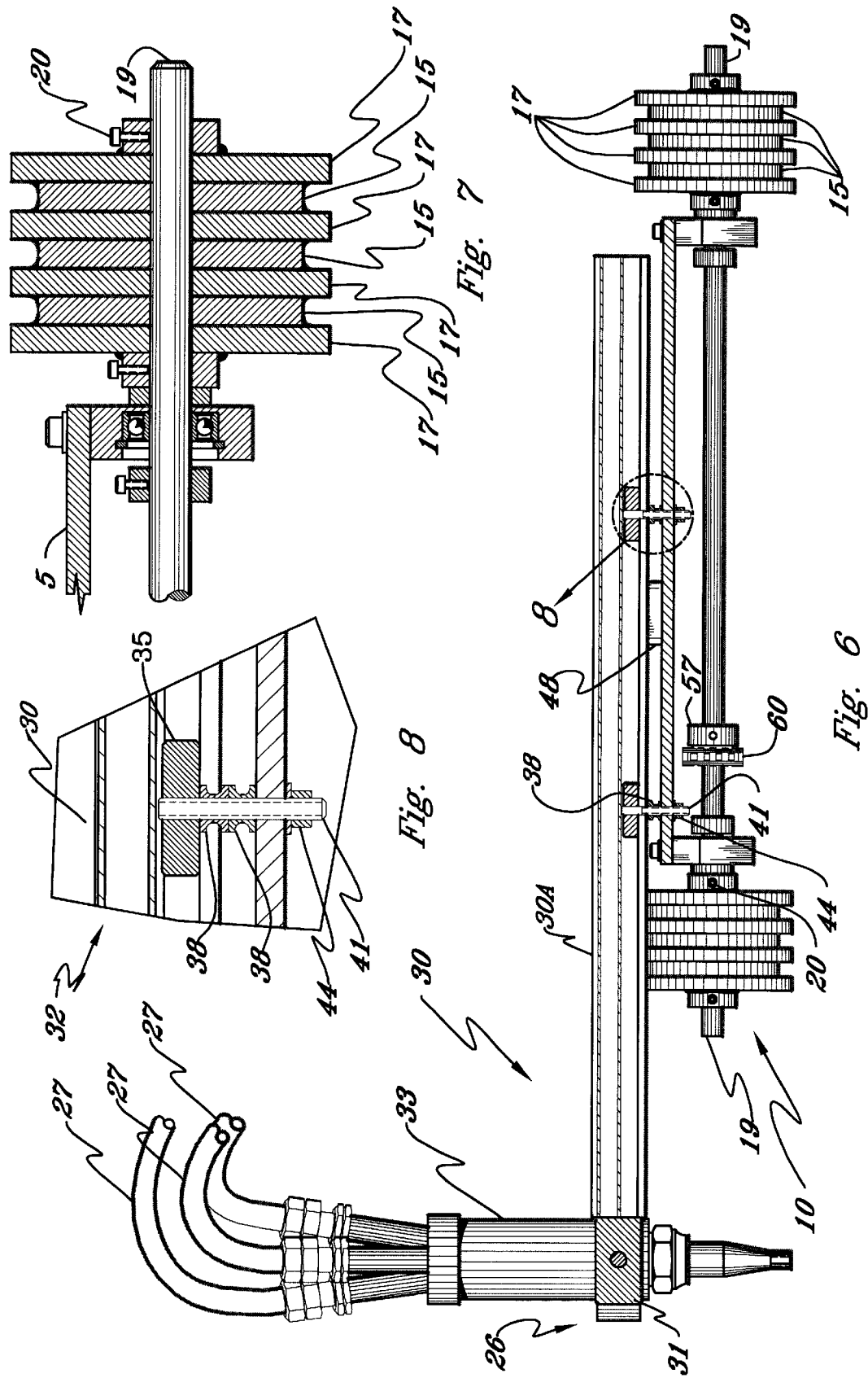

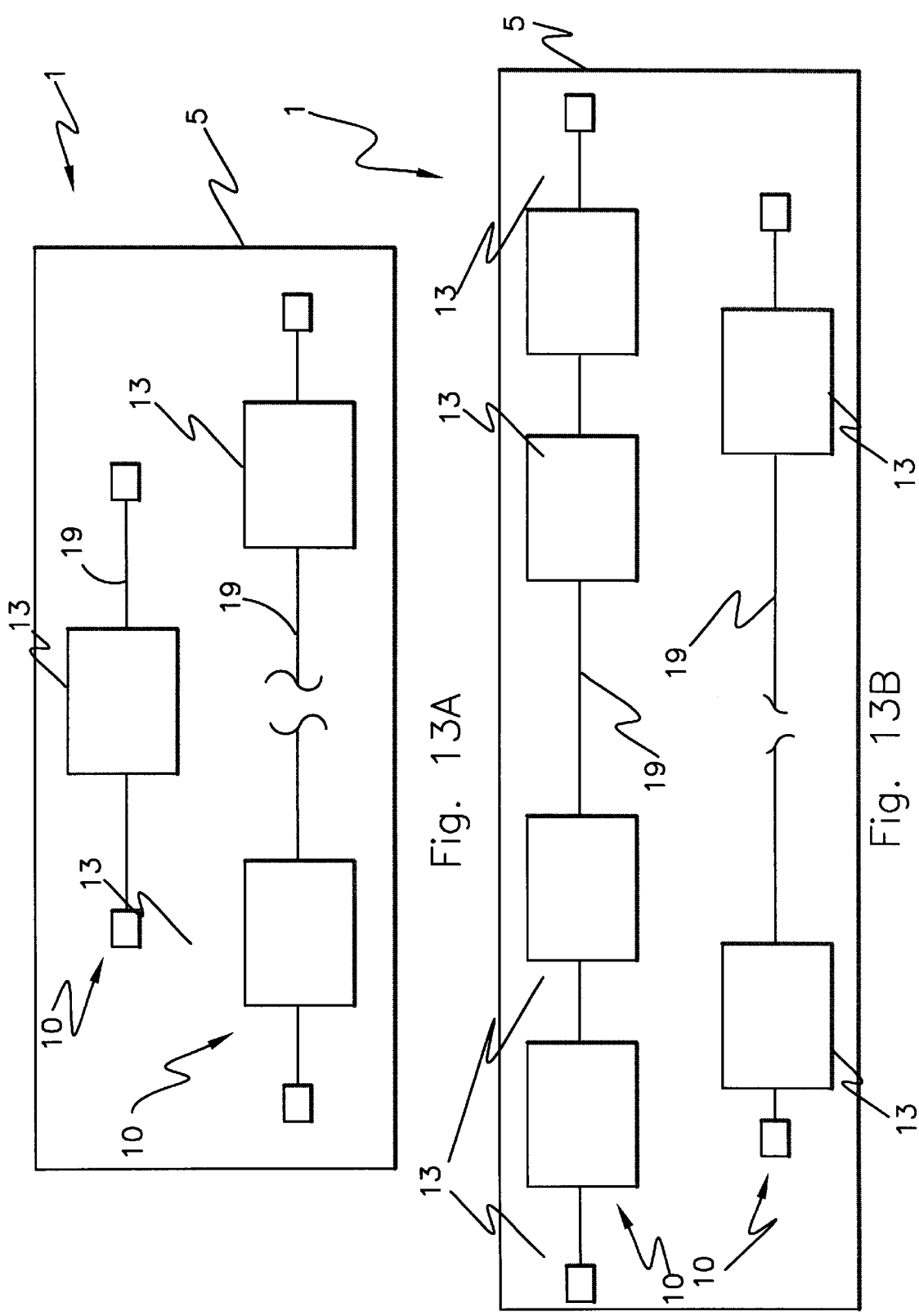

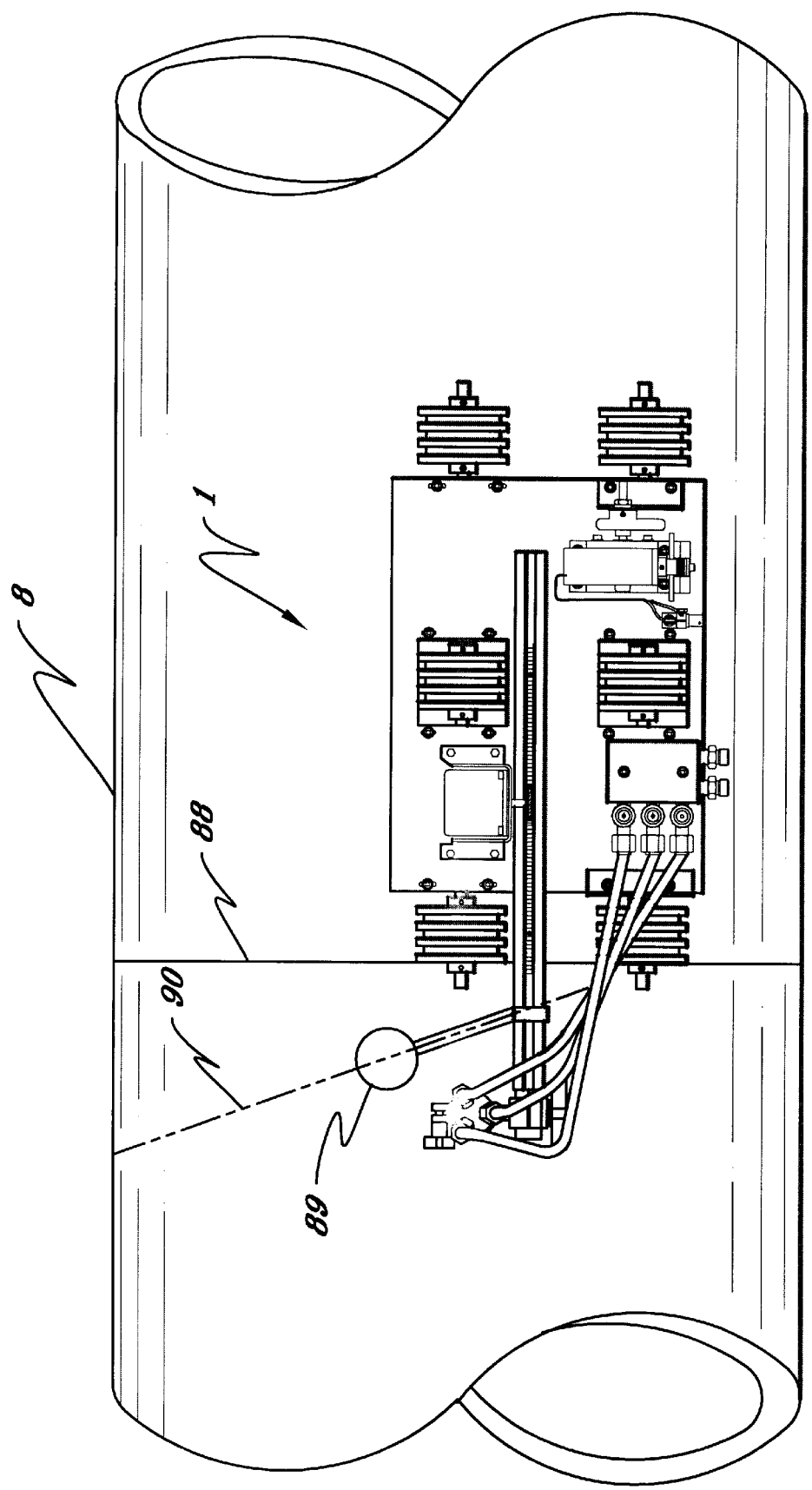

MAGNETIC WHEEL GUIDED CARRIAGE WITH POSITIONING ARM

FIELD OF THE INVENTION

The present invention relates generally to automated cutting and or welding of ferrous metal including pipe or plate and in particular to the positioning and movement of one or a plurality of carriages with positioning arms, supporting cutting and or welding means, which transports welding heads and cutting torches and associated gas, electrical or other power sources and positions said welding heads and or cutting torches at the point and along the path or pattern which requires welding and or cutting.

BACKGROUND OF THE INVENTION

Automated welding and or cutting carriages are known in the prior art which transport welding heads and/or cutting torches and related power systems, including gas hoses, power cables and wire feed, following a track, band or mechanical device or devices which requires materials and manufacturing of the device and the expenditure of labor for the installation or affixing to a pipe or along a plate prior to the mounting of a torch or welding system. Systems are known which require a level mounting pedestal and are essentially limited to use within manufacturing plants or at sites providing a substantially permanent mounting wherein pipe or plate is positioned to be accessible to the system. The permanent installation precludes the system use in the field while special site preparation requires the involvement of and expense of skilled workman. Bug-O® Systems describes a GO-FER III DELUXE KIT which permits a torchholder to follow a rack and pinion drive unit which is positioned by magnet plate assemblies. ESAB™ describes a Silhouette 500 Portable Shape Cutter as a cutting machine producing simple and complex shapes in a portable configuration with an X-Y axis carriage movement controlled by solid-state coordinate drive system which is transferred to a rack and pinion drive mechanism for the positioning and movement of torch heads. ESAB™ also describes the SABRE 1000, 2000 or 3000 torch cutting models using a pedestal mounted tongue and groove "T" rail positioning system incorporating roller-bearing wheels on machined rail surfaces. H&M® shows pipe cutting and beveling machines where a torch is mounted, positioned and moved by saddle and ring gear. H&M® also demonstrates a band-type guidance pipe cutting and beveling machine where a motorized torch tracks or follows one of seventeen separate sized stainless steel bands. H&M® as well shows a Model "C" adjustable torch holder featuring two rack-and-pinion driven, dove-tailed slide assemblies permitting horizontal and vertical movements. Victor® discloses a VCM-200 cutting tractor-type machine utilizing track for straight line cutting and off track cutting or welding with a radius rod assembly. Each of the foregoing is depicted in Norco™ welding catalogue, dated May, 30, 1995 at the bottom of catalogue pages, at pages 62, 63, 65, 67, 70, 71, 72, and 76 and are provided herein with the Information Disclosure Statement. Each of the indicated devices requires the prior location and affixing of a track, band or other mechanism or the use of a separate torch platform and arm. Koike Aronson, Inc. provides a welding carriage for welding applications with the carriage self-aligning to a joint and moving along a plate to accommodate variations in a plate surface; a magnet in the carriage provides stability generally in welding horizontally or vertically up to a slope up to 45° with welding facilitated, on a vertical surface, with an optional auxiliary electromagnet. The brochure from Koike Aronson, Inc. describing the described product is provided herewith in the Information Disclosure Statement. Patents disclosed include U.S. Patent to Yamashita(assignee Koike) U.S. Pat. No. 5,265,849 which discloses a motor driven torch device positioned by a moving stand, rail guide and cross shifting stand with the torch further positioned by a motor driven saddle following an arc rail and U.S. Patent to Sugiyama et. al(assignee Koike) U.S. Pat. No. 4,014,528 which discloses a hand held motor driven torch. Each of the foregoing are disclosed via an Information Disclosure Statement in accordance with 37 CFR 1.97.

SUMMARY OF THE INVENTION

The present invention composed of an apparatus and process comprises an improvement to automated cutting and or welding systems in that it eliminates the need for and the labor required in the affixing of separate track, band or other mechanical guidance devices which are required for the use of known automated cutting and welding machines. This disclosure facilitates cutting and welding in the shop or manufacturing plant site as well as at remote field work sites by eliminating the need for permanently installed cutting or welding systems or systems requiring the location of pedestals in preparation for the cutting or welding of ferrous pipe or plate.

The present invention discloses a carriage which is guided and propelled by a remote controlled motor driven magnetic wheel system. The magnetic wheel system will have at least two sets of magnetic wheels with one set having at least two magnetic wheels interconnected by axle means. In the preferred embodiments the magnetic wheel system will be composed of two sets of three magnetic wheels interconnected with an axle. An alternative embodiment will be composed of two sets of two magnetic wheels interconnected with an axle. An additional embodiment will have two sets of magnetic wheels with one set having a single magnetic wheel and a second set having a plurality of magnetic wheels. For each embodiment, the respective set of magnetic wheels are affixed to a carriage frame.

The carriage will bear one or more positioning arms having means to accept cutting and/or welding heads. The arm has a longitudinal axis generally orthognal to the direction of carriage travel which positions the cutting and/or welding head generally outside the path of carriage travel. The positioning arm may be automated.

The carriage, or multiple carriages if required, supports the carriage drive and transmission means, implements and materials required for cutting and or welding and positioning arm. Multiple carriages may be utilized wherein more than a single carriage is required to transport cutting and or welding materials. For example, a first carriage may transport an automated positioning arm with welding head and arm drive power means along with additional components and materials associated with the particular welding process with a second carriage transporting, for example, the wire feed material connected to and used by the first carriage welding process. Multiple carriages may also be employed wherein multiple cutting and/or welding operations are conducted simultaneously. The carriage is positioned and transported by the magnetic wheel system to facilitate welding and cutting along a line or pattern on ferrous material including plate or pipe.

A torch or welding head is positioned by carriage tracking or by a combination of carriage tracking and automated positioning arm movement. The carriage movement or tracking is accomplished in particular without the installation of separate track, band or other mechanical guidance devices. A primary object of the invention is to reduce set up time for use of automated cutting or welding systems by the elimination of need for installation of carriage guidance jigs, tracks, bands or guides which require positioning and fastening and, in some instances, welding and or cutting for installation. An additional object of the invention is the elimination of the expense required for the material and manufacturing of such guidance devices. An additional object of this disclosure is the method of positioning the torch or welding head for cutting or welding functions as requiring for positioning 1) only by the scribing of a reference line on the subject plate or pipe where the guidance of the carriage and hence torch or welding head positioning depends solely upon the precision of the tracking provided by the magnetic wheel system or 2) the combination of carriage tracking provided by the magnetic wheel system and the movement of the automated positioning arm controlled by guidance means such as photosensor guidance means in tracking an applied guidance line composed of a surface detectable by a sensor, for example a reflective reference tape, for positioning the automated positioning arm. A principle object of the invention is the ability to 1) scribe a reference line for placement of the invention; 2) place the invention upon plate or pipe, with the magnetic wheel means aligned with the reference line so scribed on the surface; 3) adjust the cutting or welding head position by adjustment of the positioning arm and commence cutting or welding operations. Additionally, where the positioning arm is automated with guidance means 1) determine the pattern to be followed by the cutting or welding head; 2) apply a guidance line, for example a reflective tape for a photosensor; 3) align the sensor with the guidance line and the process of cutting or welding is commenced.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIG. 5 is a front elevation 5—5(FIG. 4) of the invention showing one set of two magnetic wheels with axle and non-ferrous axle mounting means; a drive means consisting of a variable speed DC motor and chain and sprocket drive; the arm with torch mounting means with torch; and gas hoses with gas fitting means.

FIG. 6 is section 6—6(FIG. 4) along the longitudinal axis of the arm and through the carriage frame between the two sets of magnetic wheels showing a front elevation of the invention demonstrating one set of two magnetic wheels with axle and non-ferrous axle mounting means; a portion of drive means consisting here of a chain and sprocket drive; the arm with torch and torch mounting means and the torch mounting units.

FIG. 7 is partial section 7—7 (FIG. 4) of the magnetic wheel guided carriage with positioning arm showing a detail of a magnetic wheel means; shown is one magnetic wheel with axle and axle mounting means in relation to the carriage.

FIG. 8 is a section (FIG. 6) of the arm showing a means for mounting a positioning arm including an arm mounting unit with arm guide, finger nuts, stud and locking nut.

FIG. 9 is a section (FIG. 5) detail depicting a gas manifold with gas fittings including gas flow control valves.

FIG. 13A is a schematic representation of an alternative embodiment of the magnetic wheel guided carriage with positioning arm wherein a first set of magnetic wheels has at least one magnetic wheel; a second set of magnetic wheels has two or a plurality of magnetic wheels interconnected with an axle.

FIG. 13B is a schematic representation of an alternative embodiment of the magnetic wheel guided carriage with positioning arm wherein each of two magnetic wheel sets utilize a plurality of magnetic wheels consisting of two or more magnetic wheels.

FIG. 13C is plan view of the magnetic wheel guided carriage with positioning arm showing the invention magnetic wheel system aligned with a scribed reference line. The positioning arm has attached a guidance means in the form of a photosensor. A guidance line is shown at an angle to the reference line with the photosensor causing the arm to extend or retract in maintaining the arm position relative to the guidance line as the invention follows a path of travel along the reference line.

DETAILED DESCRIPTION

Figure 1:
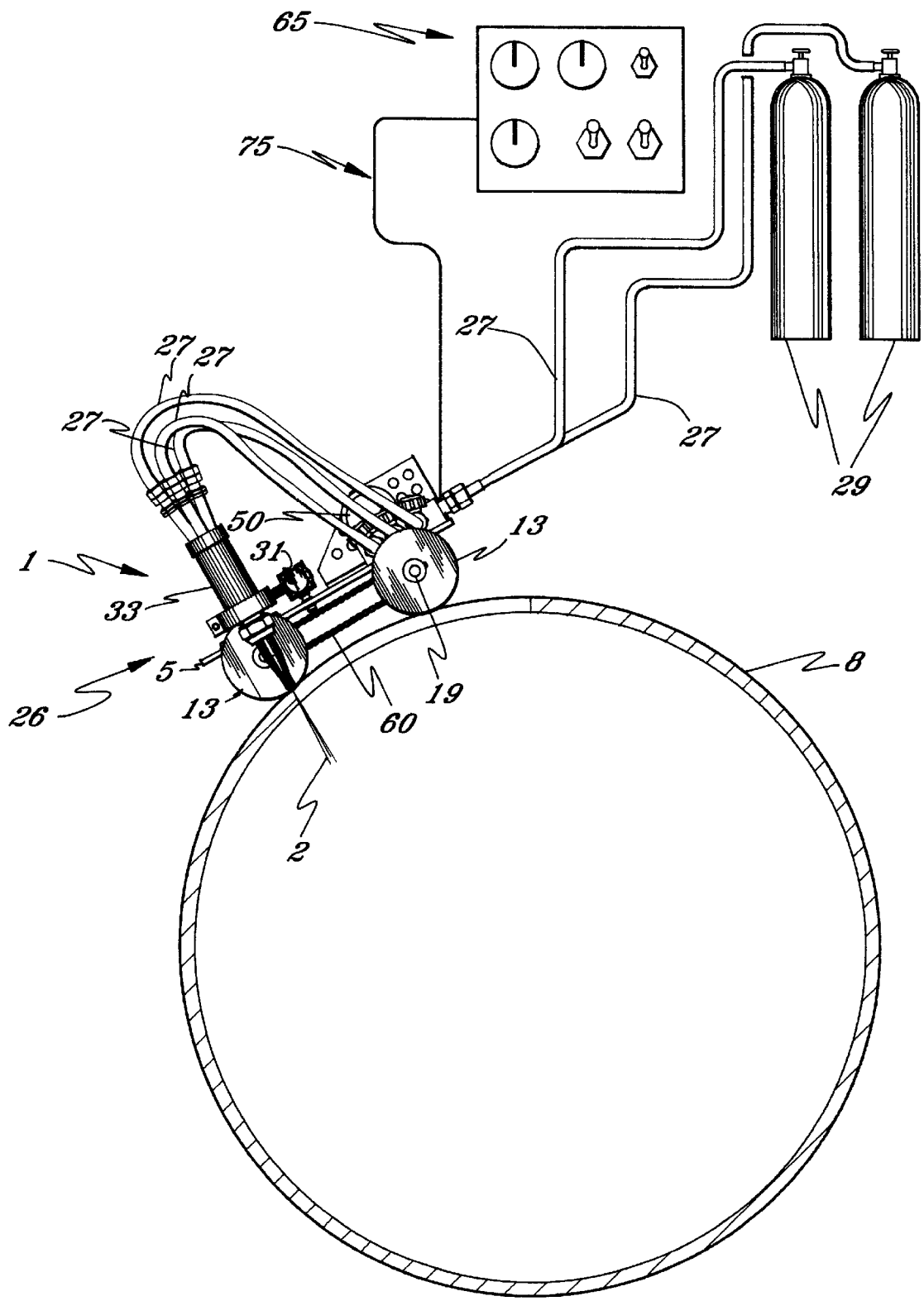
FIG. 1 is a side elevation of the magnetic wheel guided carriage with positioning arm showing the invention in position for cutting or welding a pipe while towing cables or gas hoses and power or control cables. A remote control means or unit denominated carriage and arm controller is depicted along with gas supplies required for cutting. A section view of the pipe shows a partial cut.
Figure 2:
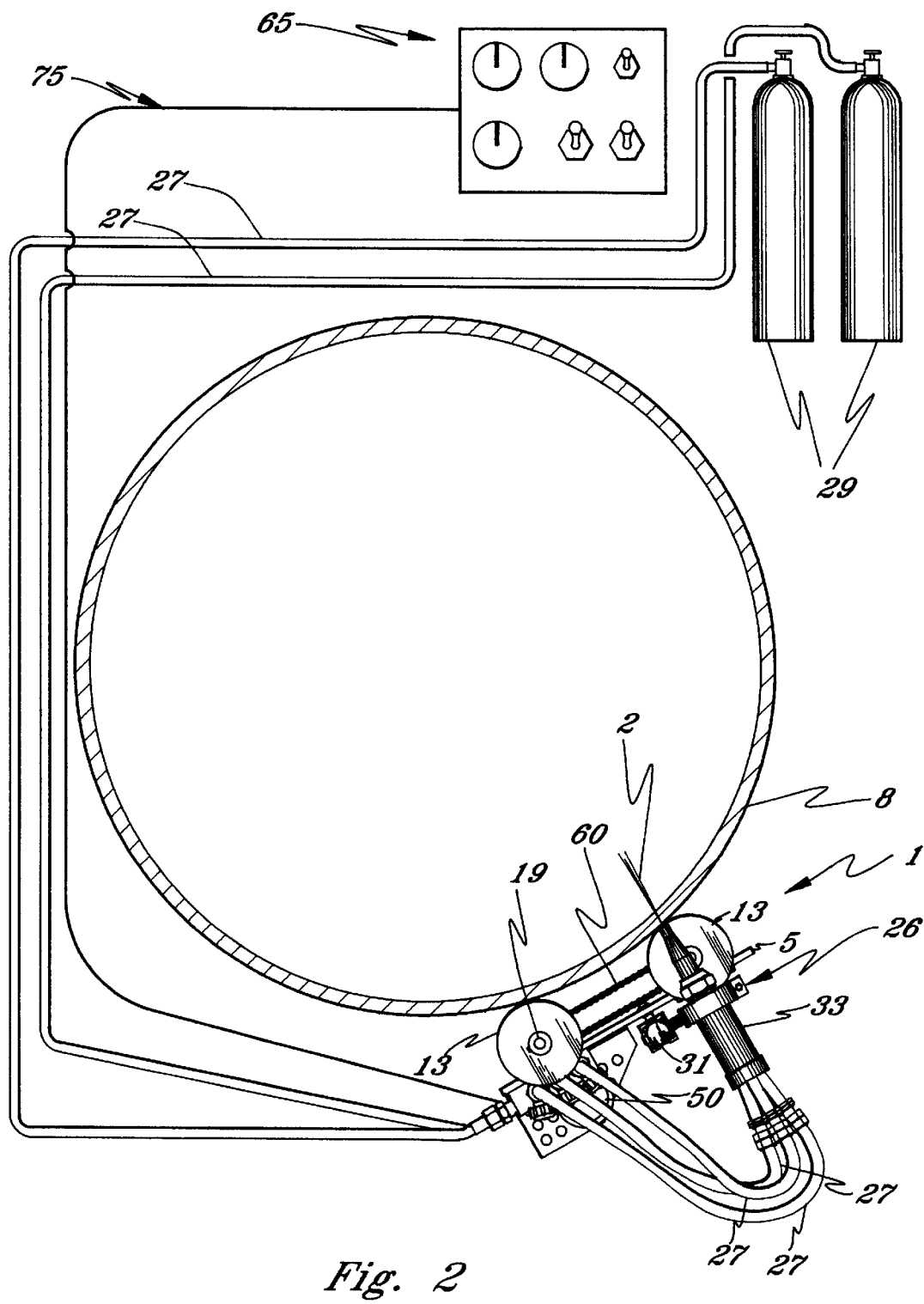
FIG. 2 is a side elevation of the magnetic wheel guided carriage with positioning arm showing the invention in position for cutting or welding a pipe as the carriage traverses around the perimeter of a pipe having passed a 0 degree slope and proceeding toward a vertical position to conclude the traverse of the entire perimeter of the pipe. The pipe is shown in section view demonstrating a partially completed cut.
Figure 3:
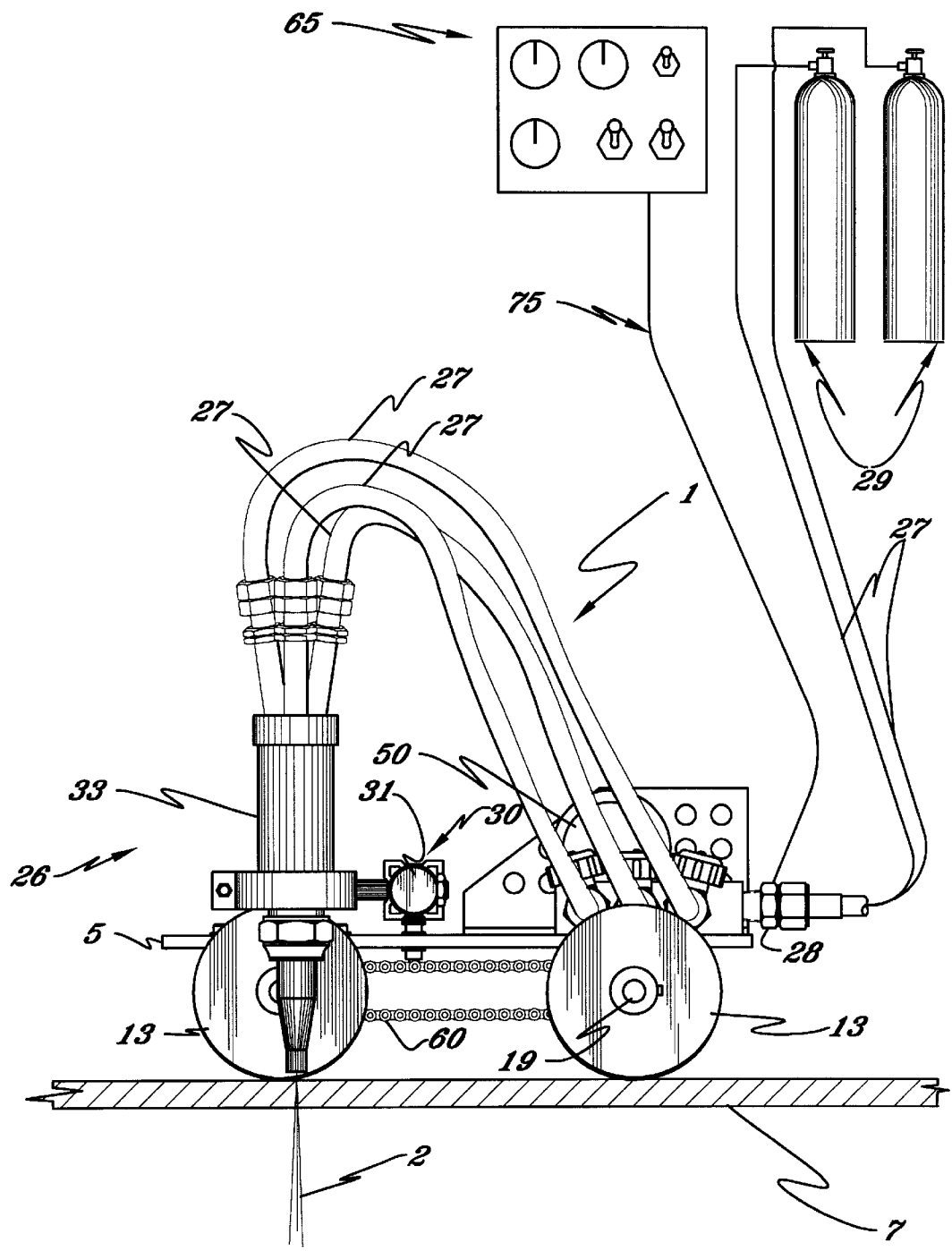
FIG. 3 is a side elevation of the invention positioned for cutting or welding a plate surface.
Figure 4:
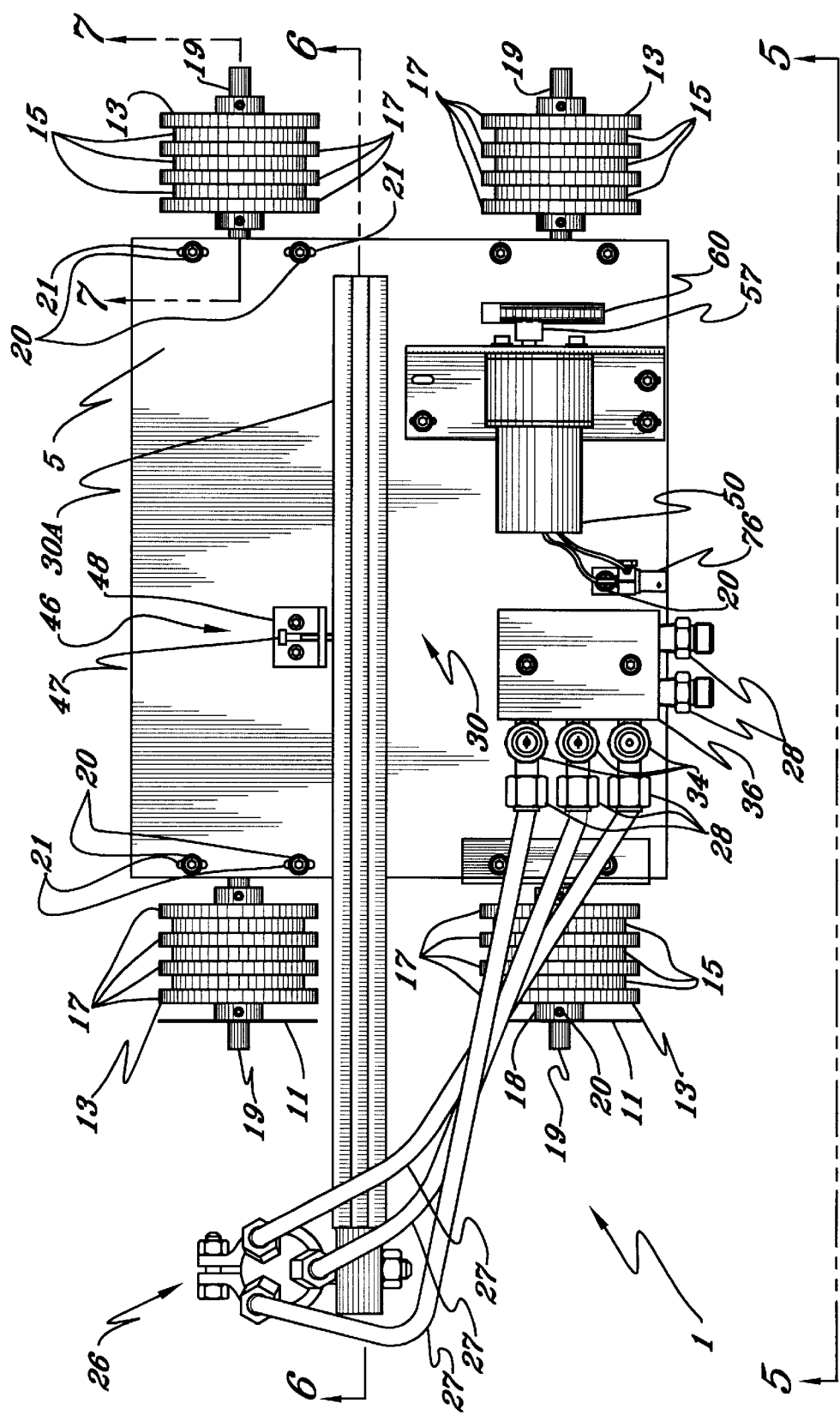
FIG. 4 is a top plan view of the invention showing the carriage frame, magnetic wheel means in the form of two sets each of two magnetic wheels interconnected with spring steel axles with magnetic wheel drive means in the form of a variable DC motor with chain and sprocket, positioning arm with arm and arm positioning lock and torch means mounted with gas hose and gas fitting means via a gas manifold.
Figure 10:
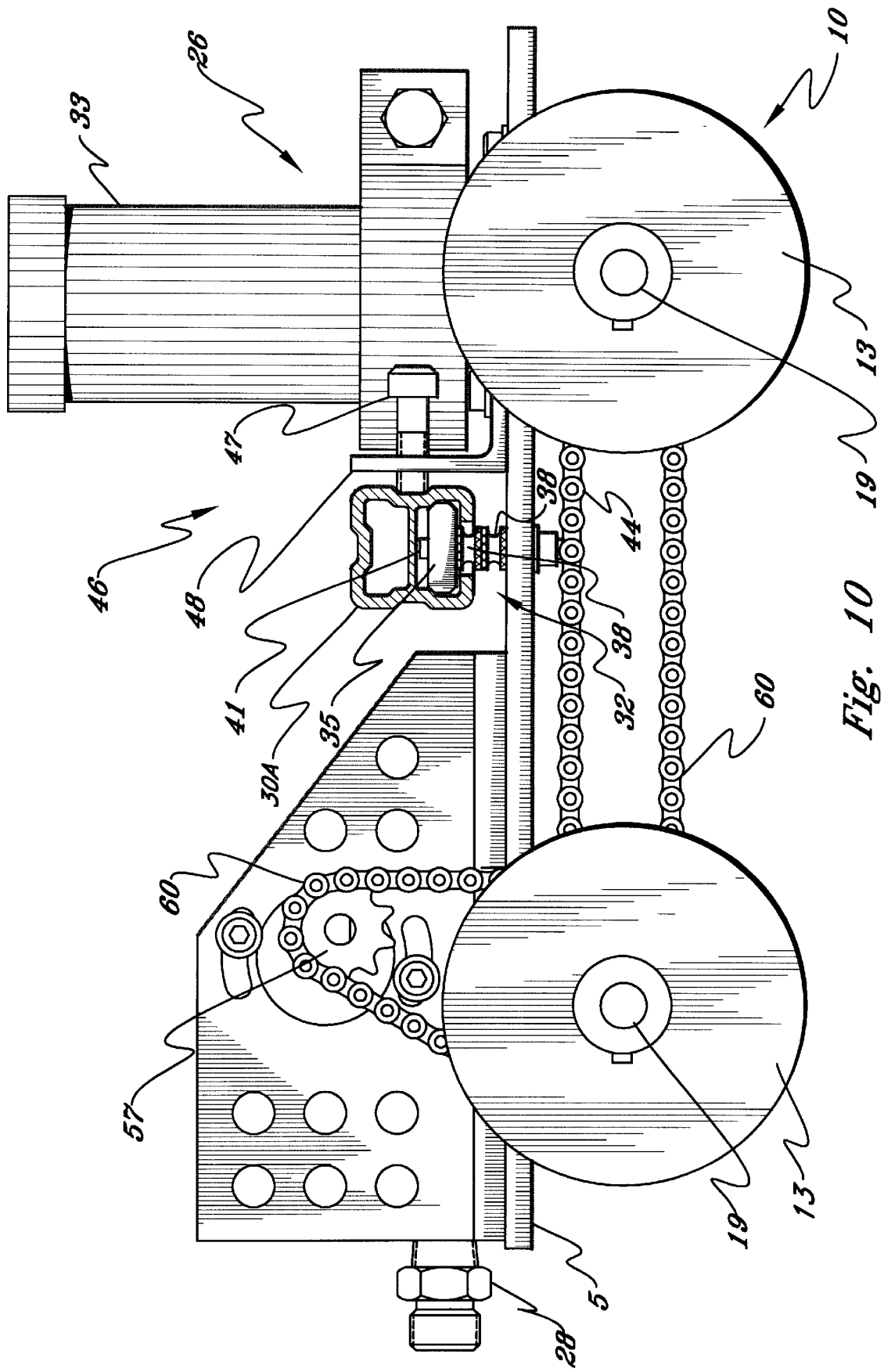
FIG. 10 is a side elevation 10—10 (FIG. 5) showing magnetic wheels, drive power mounting means, transmission means including chain and sprocket, arm, arm mounting unit with arm guide, finger nuts, stud and locking nut, arm position lock with locking screw, locking bracket and anchor screw and torch mounting means with torch.
Figure 11:
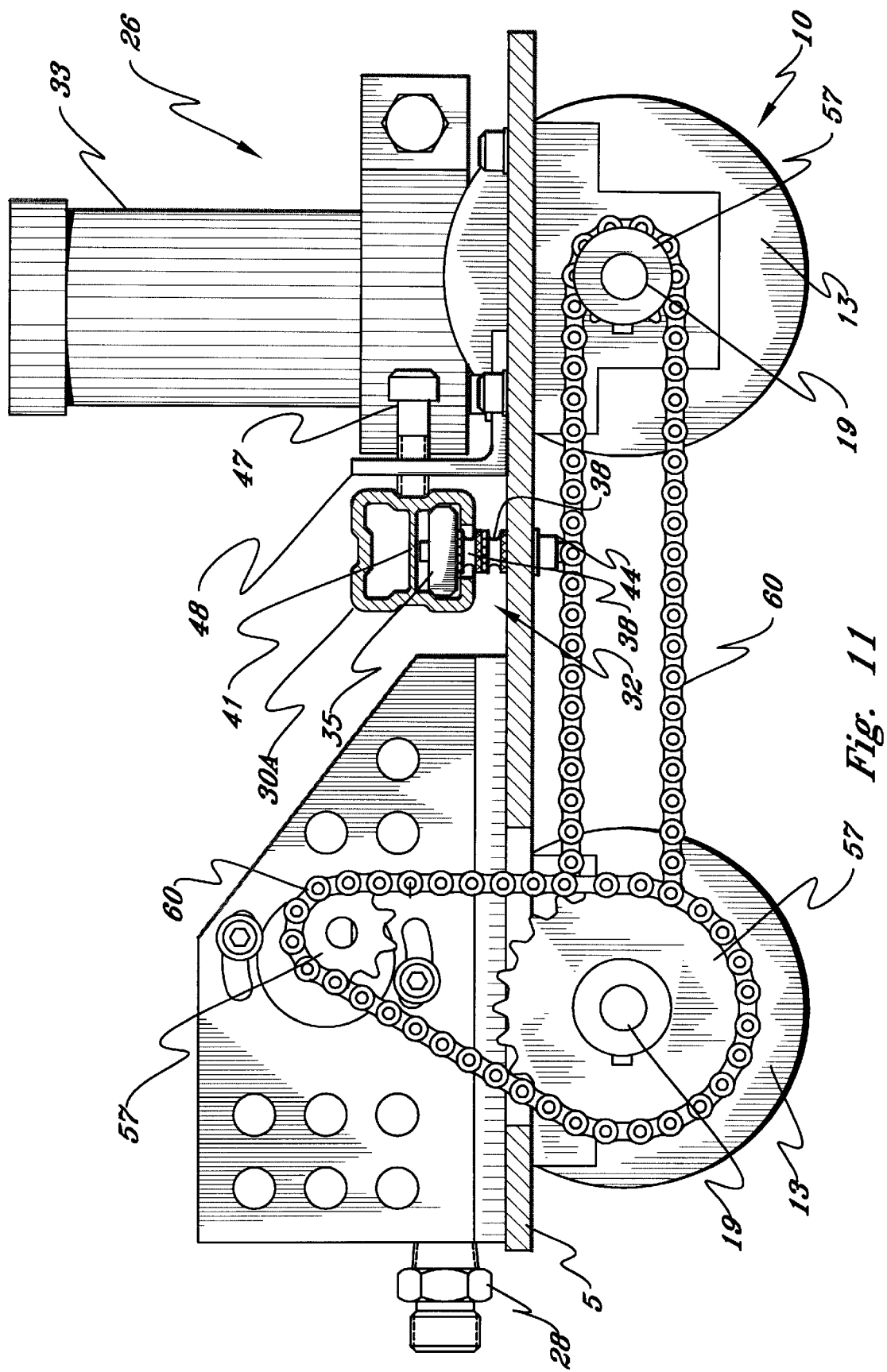
FIG. 11 is an elevation section 11—11 (FIG. 5) showing additional detail of the transmission means in the form of chain and sprocket with transmission means indicated for each axle.
Figure 12:
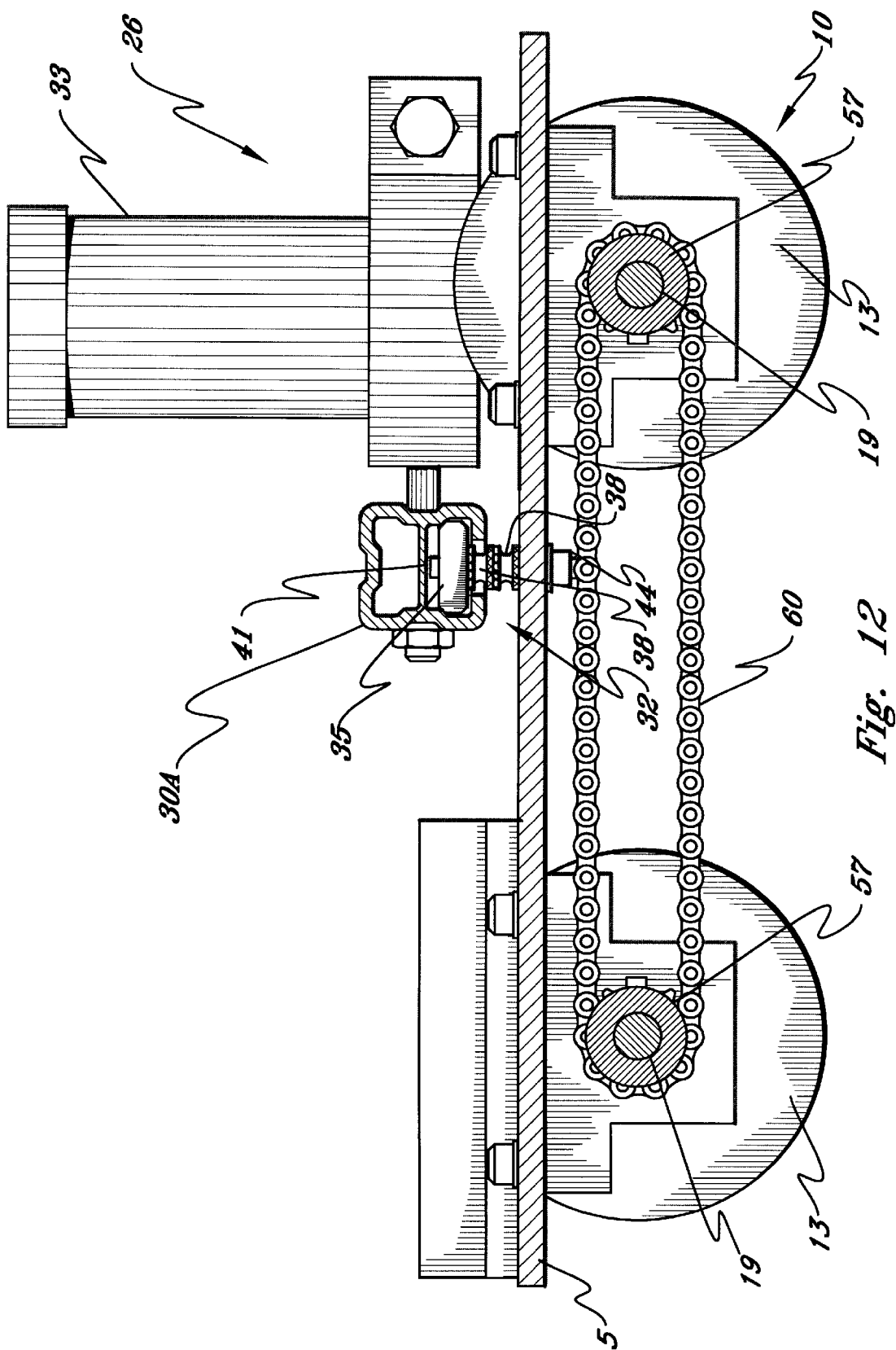
FIG. 12 is an elevation section 12—12 (FIG. 5) showing additional detail of the transmission means in the form of chain and sprocket.
Figure 13:
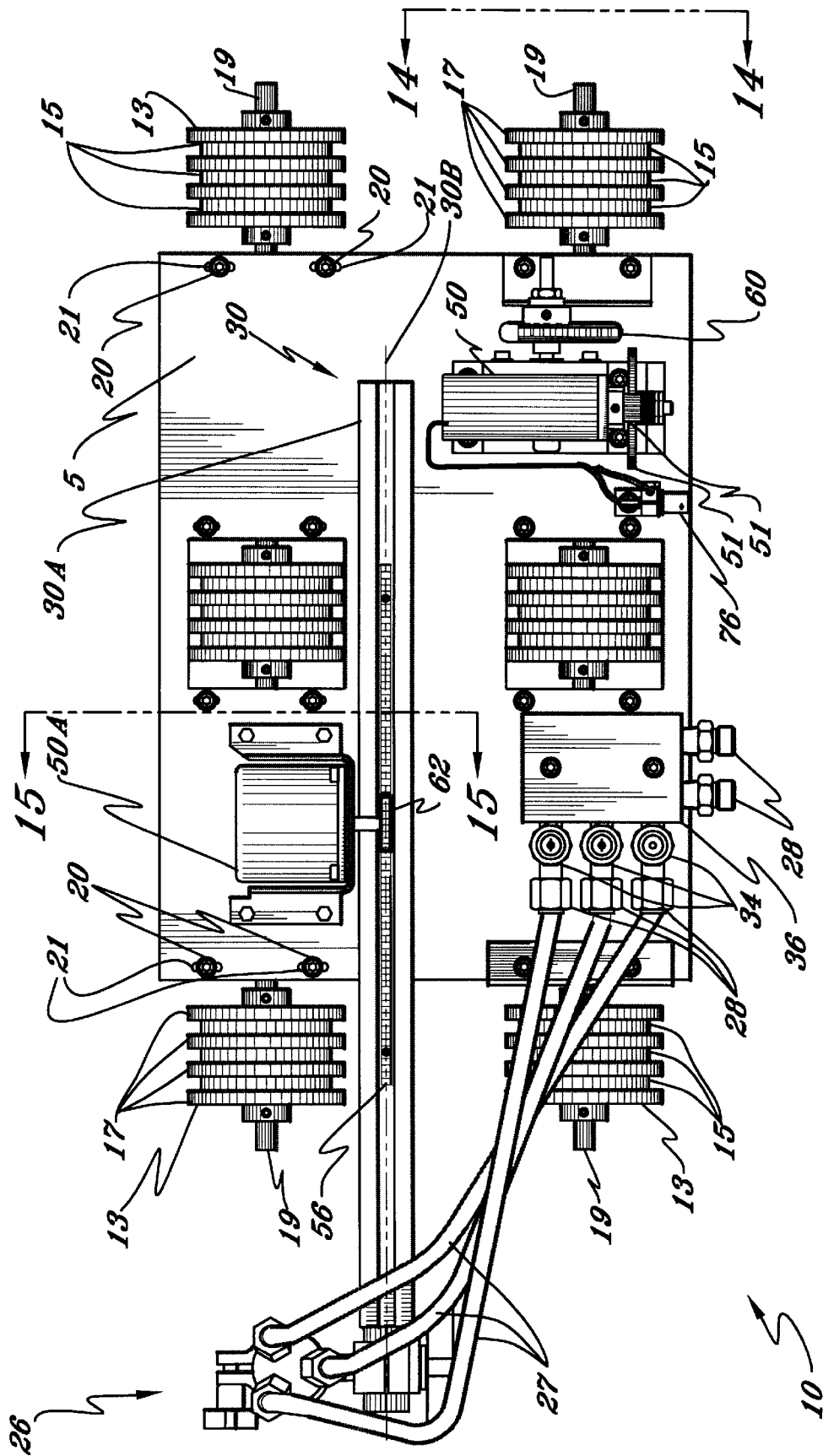
FIG. 13 is a drawing of the preferred embodiment of the magnetic wheel guided carriage with automated positioning arm wherein the magnetic wheel means is comprised of two sets of three magnetic wheels with each set of magnetic wheels interconnected with axle means in the form of a spring steel axle. The composition of the magnetic wheel means is shown and is also seen in FIGS. 4, 5, 6 and 7. Also shown is the non-ferrous axle mounting means with bearing along with the bearing block, bolt and nylon washer configuration which is common with that found in the embodiment of FIGS. 4, 5, 6 and 7.

The preferred embodiment of the magnetic wheel guided carriage with positioning arm 1 is illustrated in FIGS. 1, 2, 3, 10, 11, 12, 13, 13A, 13B, 13C and 17 wherein a magnetic wheel system 10 is affixed to a carriage and is comprised of two sets of three magnetic wheels 13 with each set of magnetic wheels interconnected with an axle 19 composed for example of spring steel. A positioning arm 30 with arm 30A having bracket means to accept cutting and/or welding heads is affixed to the carriage 5 having a manual arm adjustment and an arm locking means. An alternative embodiment is illustrated in FIGS. 4, 5, and 6 wherein the magnetic wheel system 10 is comprised of two sets of two magnetic wheels 13 with each set of magnetic wheels interconnected with an axle 19. Alternative embodiments are illustrated in FIGS. 13A, 13B wherein two sets of magnetic wheels 13 may be composed of one or a plurality of magnetic wheels 13. An embodiment wherein the positioning arm 30 is automated is illustrated in FIGS. 13, 13C, 17 and 18.

Figure 14:
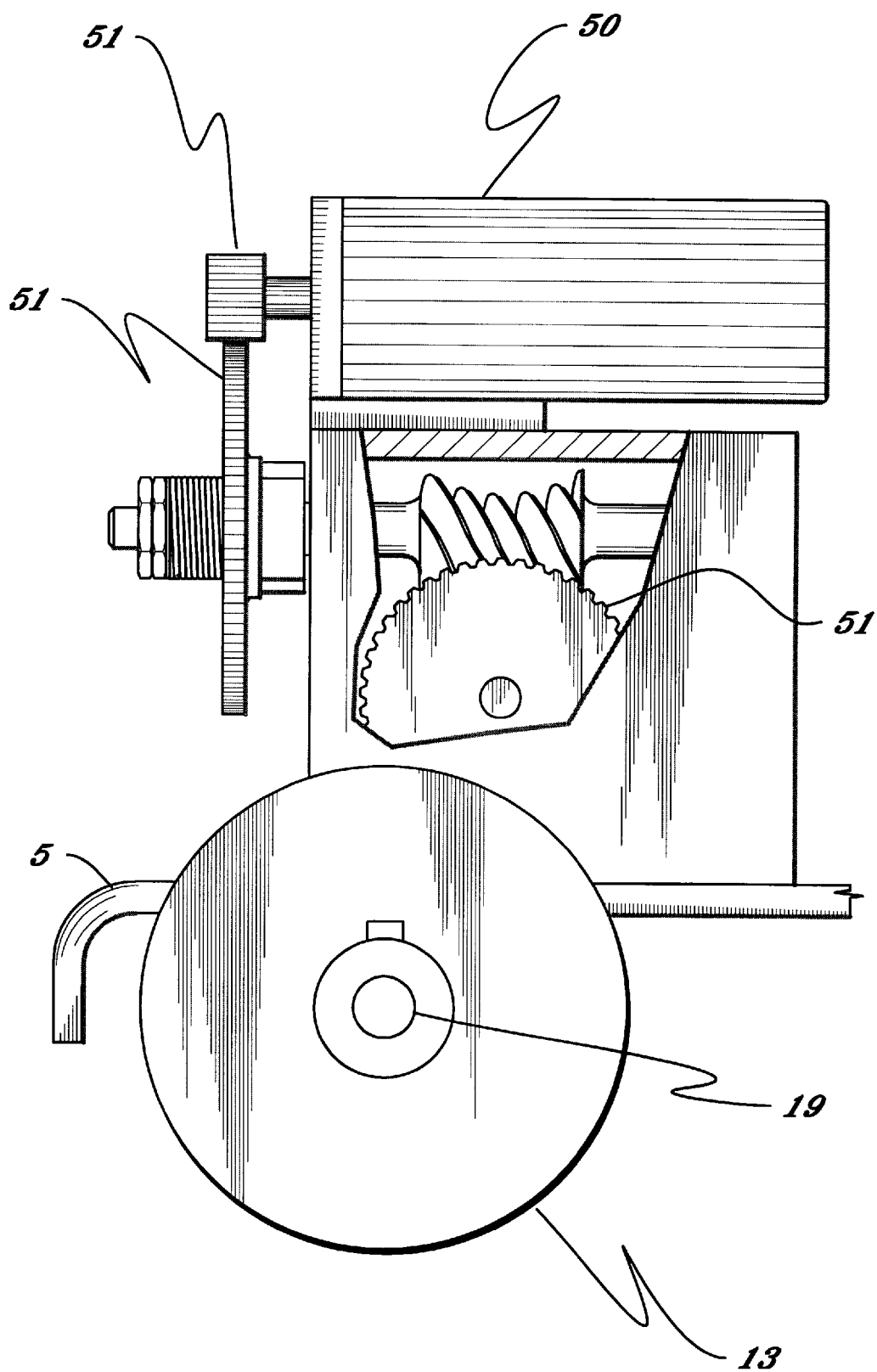
FIG. 14 is a section 14—14 (FIG. 13) primarily showing a detail of a drive power means in the form of a variable speed DC motor with gears and shaft.
Figure 15:
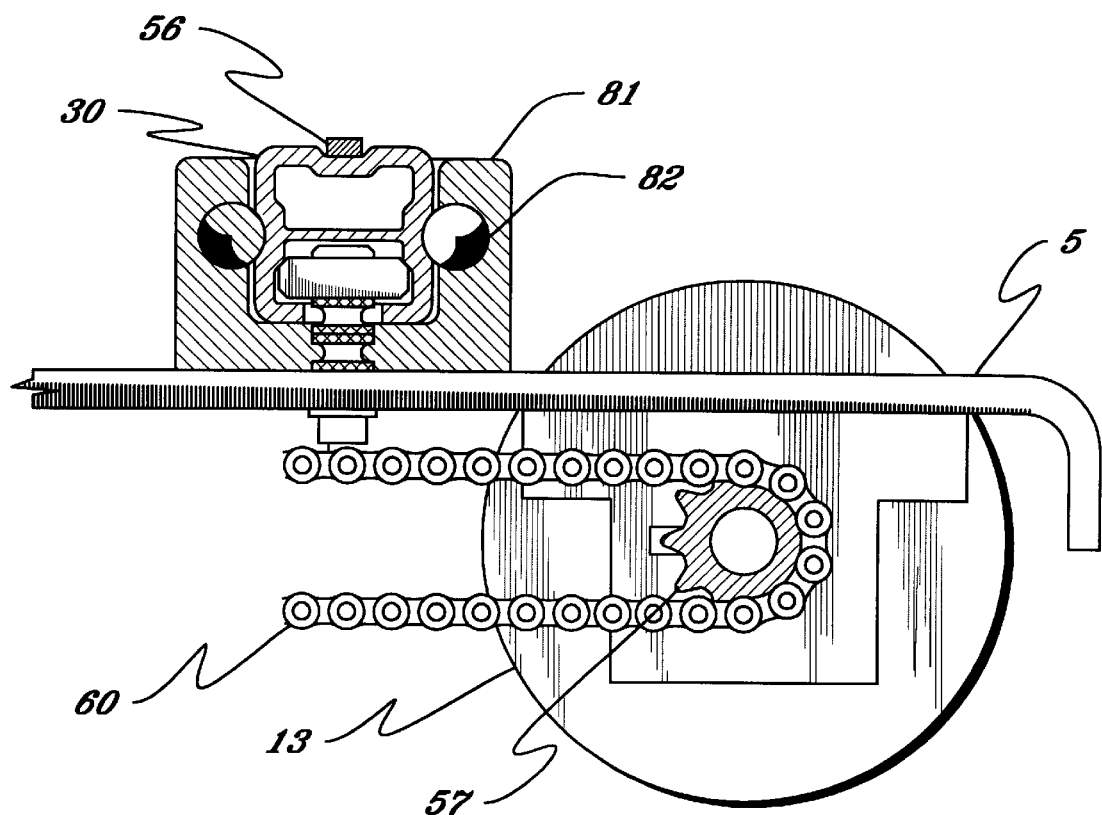
FIG. 15 is a section 15—15 (FIG. 13) primarily showing a detail of a bearing means, in the form of a guide block and ball bearing, facilitating the movement of the arm.
Figure 16:
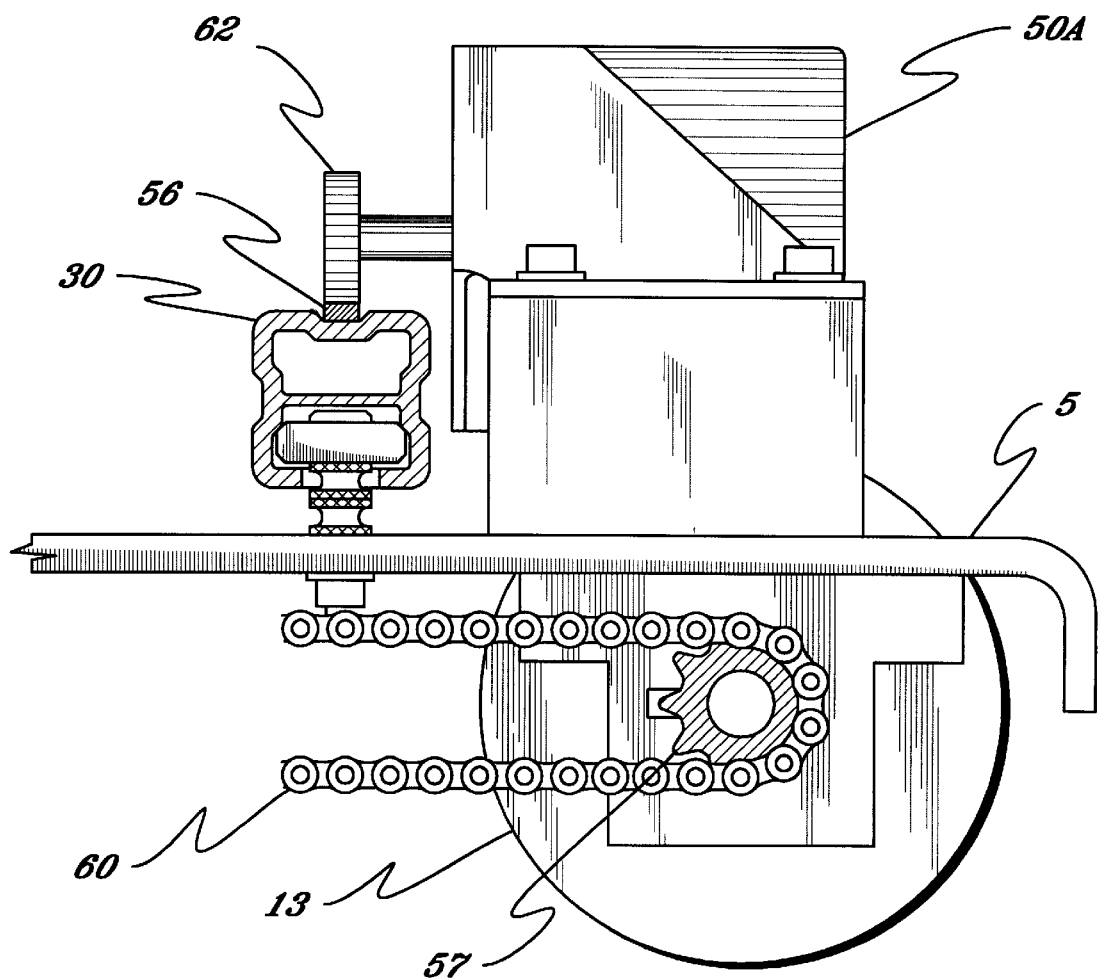
FIG. 16 is a section 16—16 (FIG. 13) primarily showing a detail of a drive power means for movement of the arm showing the interrelationship of gear and gear rack portion of the arm.
Figure 17:
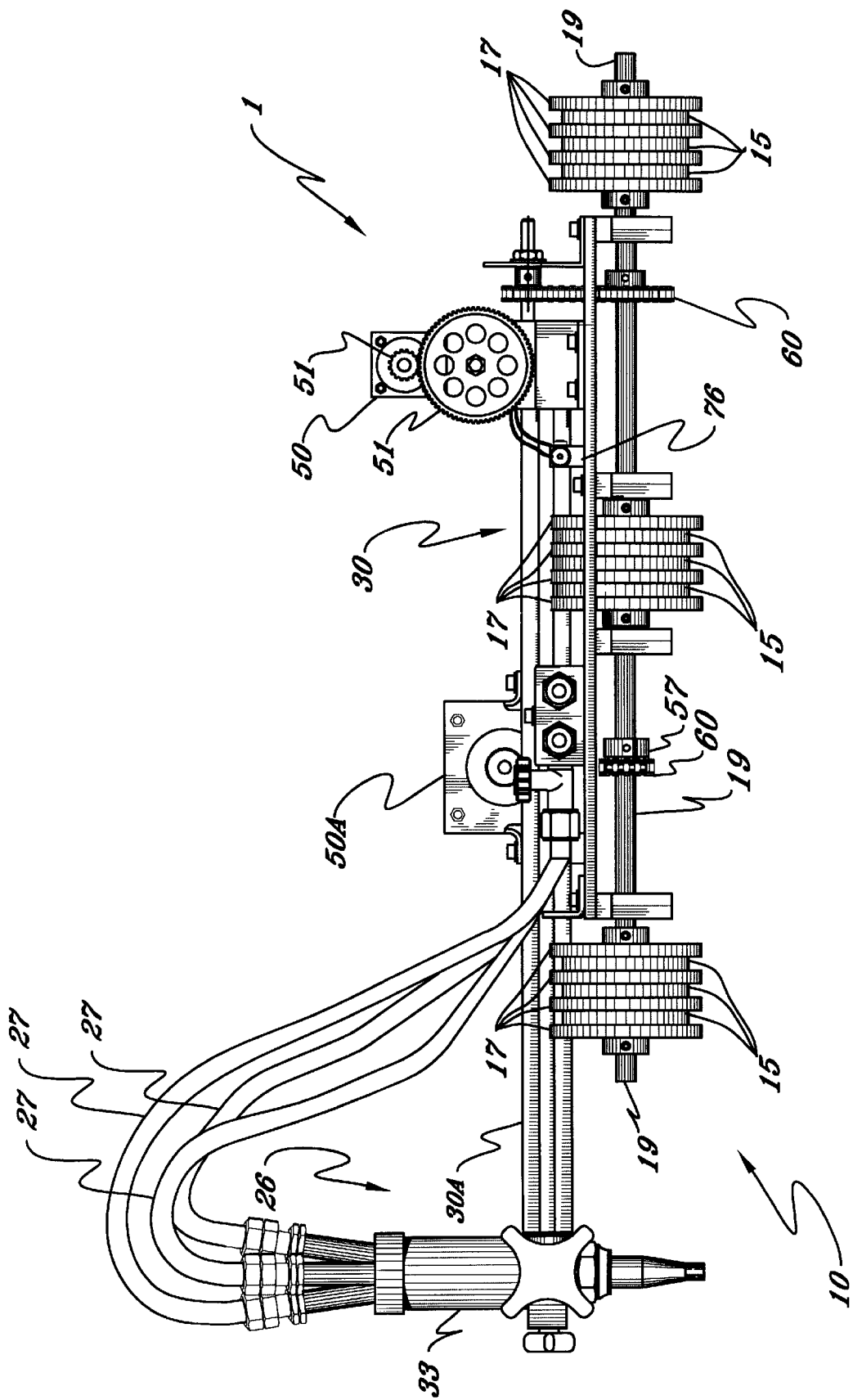
FIG. 17 is a front elevation 17—17 (FIG. 13) of the preferred embodiment of the invention showing one set of three magnetic wheels with axle and non-ferrous axle mounting means; a driven and transmission means consisting of variable speed DC motor, chain and sprocket; the positioning arm with drive power means in the form of arm variable speed DC motor; torch mounting means with torch and gas hoses with gas fitting means.
Figure 18:
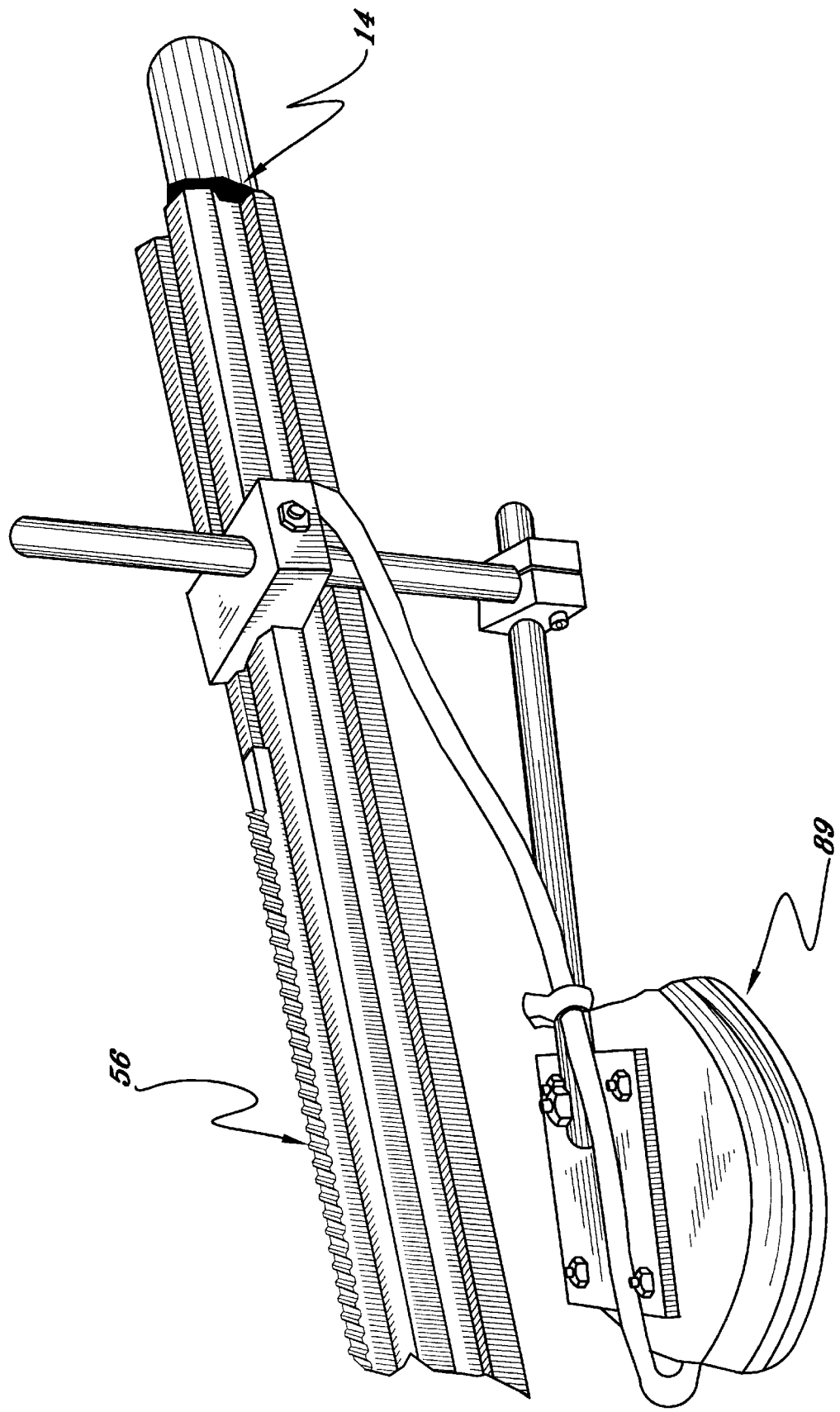
FIG. 18 is a detail showing a partial view of a positioning arm without torch with sensor means and sensor mounting means; depicted as sensor means is a photosensitive device 89 utilized controlling the arm variable speed DC motor for positioning the arm.

The components comprising the invention are composed, to the extent possible, of non-ferrous materials. A carriage frame 5, comprised for example of ³⁄₁₆" Alcoa-50-50 aluminum plate 18"×10", is machined or otherwise formed to receive mounting means for a magnetic wheel system 10; drive power and transmission means, for the magnetic wheel system 10, affixed to the carriage and mechanically interrelated to the magnetic wheel system, provided for example by a variable speed DC motor 50, illustrated in FIG. 14, and spur gear, chain and sprocket 51, 60, 57, illustrated in FIGS. 5, 10, 11, 12, 13, 14 and 15; a positioning arm 30 and mounting means for the positioning arm 30 having an arm 30A with an arm longitudinal axis 30B illustrated in FIGS. 6, 10, 11, 12, 13, 15, 16, 19; arm drive power means, affixed to and mechanically interrelated to the positioning arm 30, provided for example by electrical, hydraulic or pneumatic motors and, provided for example, by a variable speed DC motor denominated arm variable DC motor 50A, illustrated by FIG. 16; mounting means for cutting and/or welding materials; and mounting means for control means for both the magnetic wheel system 10 and the positioning arm 30; arm 30A having bracket means disposed thereon to receive and to position cutting and/or welding means generally orthogonally to and outside the path of travel of the invention; said bracket means provided, for example, as in the invention, by a torch mount 26 comprised of a torch arm workpiece adaptor 30. The torch mount 26 bearing a torch 33.

The magnetic wheel system 10, illustrated in FIGS. 4, 5, 6, 7, 10, 11, 12, 13, 13A, 13B, and 17, is comprised of two or more magnetic wheel means where the magnetic wheel means are interconnected, for example, with axles 19 which may be composed of spring steel, and with one or more of the magnetic wheel means being adjustable via bolts 20 and wheel alignment adjustment slots 21. The magnetic wheel system 10 is mounted, for example, to the carriage frame by non-ferrous wheel mounting means such that during operation all magnetic wheel means rotate in essentially parallel planes and are positioned with the intent to generally place all magnetic wheel means simultaneously in contact with the plate, pipe 7, 8, or other ferrous surface to be cut or welded. One or more of the magnetic wheel means are connected via transmission means, including, for example, gears, sprockets, chains, belts or other transmission means, to a drive power means including, for example, variable speed motors including electric, pneumatic and hydraulic motors. While the mounting orientation of the magnetic wheel system 10, in the preferred embodiment, is such that the travel of the invention is generally orthognal to the arm longitudinal axis 30B, other mounting orientations of the magnetic wheel system 10 and or positioning arm 30 may be employed which will generally insure that the arm 30A extends generally outside the path of travel of the invention.

A remotely operated carriage and arm controller 65 is connected, for example, by electrical and/or control cables 75 or telemetry 66 via connection means including, for example, a data and control connection 76, to power drive means for rotation of the magnetic wheel means and arm drive means for positioning of the arm 30A, with arm drive power means provided for example by an arm variable DC motor 50A. Power means is also provided as required by an arm position sensor means having the function of operating arm drive power means for the automated positioning of the positioning arm 30. Position sensor means, interconnected with arm drive power means, may be provided for example by a photosensitive device with associated circuitry, such as an infra-red sensor with photo interlamp and circuitry 89, for scanning a guidance line 90 to be traced or pattern to be cut or welded and causing, by operation of the arm variable speed DC motor 50A, movement of the arm 30A and hence cutting and or welding head for process operation.

The preferred embodiment, FIGS. 13, 13C, 17, 18, 19, of the invention has a magnetic wheel system 10 composed of two sets of three magnetic wheels 13 with each set of magnetic wheels 13 interconnected with a spring steel axle 19. The two sets of magnetic wheels 13 are affixed by mounting means to the carriage frame 5 and are aligned for rotation in the same or parallel planes and are rotated by transmission means, provided for example by spur gear, chain and sprocket 51, 60, 57 which is driven by drive power means provided for example by a variable speed DC motor 50. Drive power means and transmission means are affixed by mounting means to interrelate between the carriage frame 5 and the magnetic wheel system 10.

An alternative embodiment, shown in FIGS. 4, 5 and 6, has two sets of two magnetic wheel means with the magnetic wheels 13 of each set interconnected with a spring steel axle 19, the wheels aligned for rotation in the same or parallel planes and rotated by transmission means composed, for example, of chain and sprocket 60, 57 powered by drive power means provided, for example, by a variable speed DC motor 50.

The magnetic wheel means in the preferred embodiment may be composed, as illustrated for example in FIG. 7, of a combination of one or a plurality of magnetic means interleaved with one or a plurality of washer means provided, for example, as in the disclosed preferred embodiment, of 35 lb. pull pot magnetic disks 15, 2⅜" O.D. with a 1" central bore, mild steel plate wheel washers 17 having an O.D. greater than the O.D. of the magnetic disks and having a 1" central bore and a non-ferrous retainer consisting for example of a ⅞" stainless steel sleeve 18 having a sleeve bore to receive an axle. The magnetic wheels 13 in this example are assembled with four wheel washers 17 separated by three magnetic disks 15 with the wheel washers 17 and magnetic disks 15 mounted on the stainless steel sleeve 18 and fixed in place with epoxy with the outer wheel washers 17 welded to the sleeve 18. The wheel washers 17 are machined to a generally circular shape with the machine tolerance dictating, in part, the precision of the tracking of the magnetic wheel system 10 along the scribed reference line 88. The wheel washer 17 perimeter, which will be in contact with the workpiece, may be face hardened. A principle consideration regarding the selection of magnetic wheel means is the weight load to be conveyed by the invention. An additional consideration is the sensitivity of the magnetic wheel means to temperatures experienced during the cutting or welding process. A thermal resisting coating or heat shield, for example, a ceramic coating on the outermost wheel washer 17 proximate the cutting or welding process or, for example, a stainless steel disk 11, illustrated in FIG. 4, intermediate the cutting or welding cutting flame(torch flame 2) and the wheel washer 17 proximate to the torch flame 2, may be installed to reduce the effects on the magnetic wheel system 10 from the heat generated by the torch flame 2.

Figure 19:
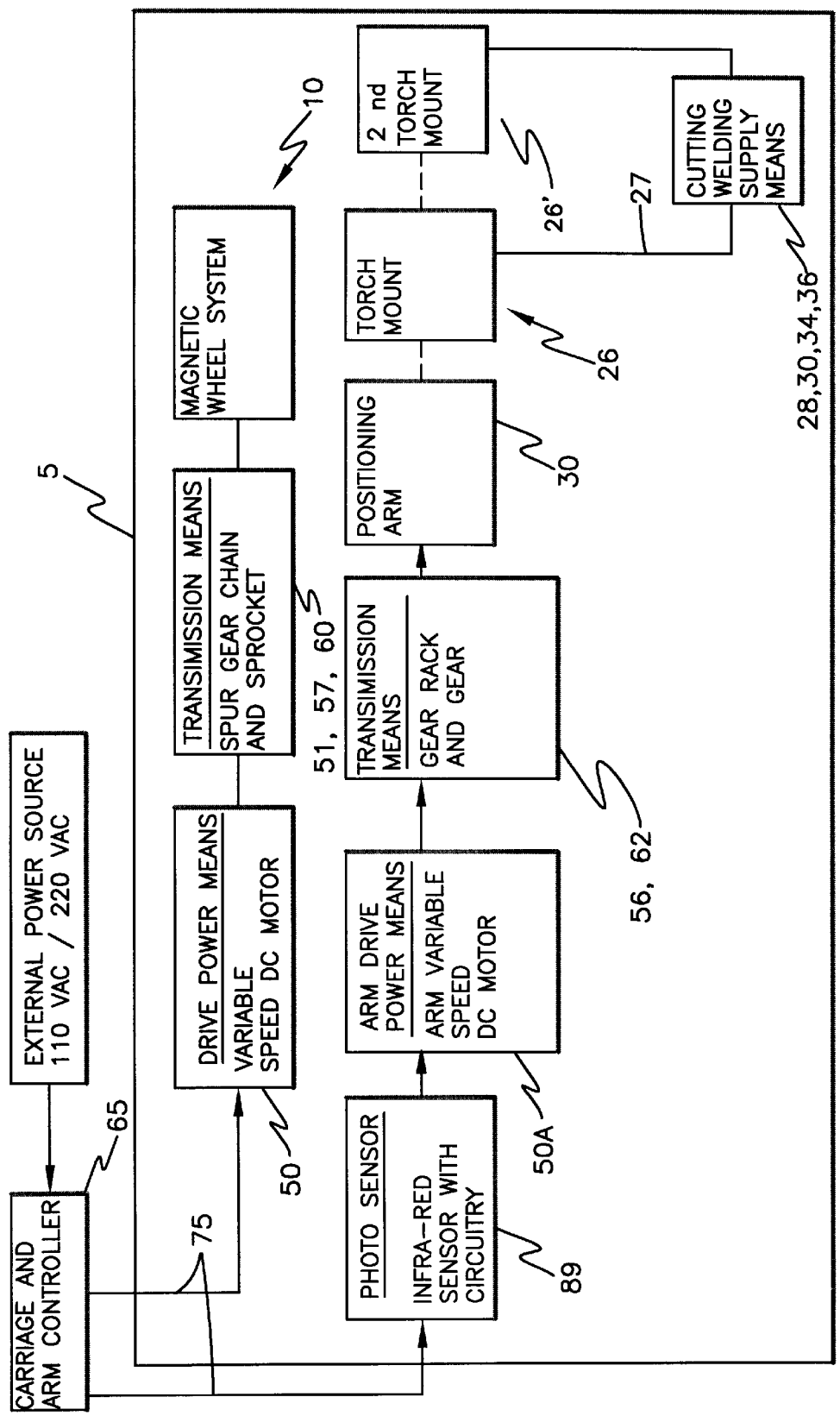
FIG. 19 is a.schematic diagram of the magnetic wheel guided carriage with positioning arm depicting a magnetic wheel system powered by a variable speed DC motor and spur gear, chain and sprocket; an automated positioning arm is depicted controlled or positioned by a photo sensor controlling a variable speed DC motor and gear rack and gear; cutting and welding supply means is depicted. Means to mount a plurality of cutting and or welding heads is indicated.

An arm means provided, for example, in the disclosed invention, by a positioning arm 30, provides a means to accept bracket means for the mounting and positioning of cutting and welding heads and may be composed, for example, as shown in the associated drawings, of an arm 30A formed from generally tubular metal and affixed to the carriage frame 5 by means including, for example, an arm mounting unit 32 affixed to the carriage and securing the positioning arm and composed of an arm guide 35, finger nuts 38, stud and locking nut 41, 44. The arm 30A having a means of extension and retraction along an arm longitudinal axis 30B provided by manual operation or by arm power and transmission means provided, for example, by an interrelated gear rack and gear 56, 62, as illustrated in FIGS. 13, 15, 16, 17 and 19, operated by an arm variable speed DC motor 50A, affixed to the carriage frame 5; the arm variable speed DC motor 50A controlled by an arm position sensor or remotely from a carriage and arm controller 65. A bearing means, secured to the carriage and connected to the arm, may facilitate the extension and retraction movement of the arm 30A shown, for example, as a guide block and ball bearing 81, 82 in FIGS. 15 and 16 which is affixed to the carriage frame 5 and interrelated to the arm 30A. The positioning arm 30 is fitted with one or a plurality of appropriate bracket means or torch mounting means, including, for example, a torch mount and 2nd torch mount 26, 26' including a torch arm workpiece adaptor 31 and torch 33, to accept and position one or a plurality of cutting and or welding heads as illustrated in FIG. 19. An embodiment providing for a plurality of positioning arms 30, 30', illustrated in FIG. 20, wherein additional positioning arms 30' have photosensitive device with associated circuitry, such as an infra-red sensor with photo interlamp and circuitry 89', arm drive means such as a 2nd arm variable DC motor 50A' and 2nd arm 30' with the respective torch mount and 2nd torch mount 26, 26' receiving cutting and or welding supply means. An alternative embodiment of the arm 30A is shown in the drawings without drive means wherein arm 30A movement is accomplished by manual adjustment with a locking means to secure the arm in a fixed position, illustrated for example in FIGS. 4, 6, 8, 10, 11 and 12 as an arm position lock 46 comprising a locking screw and locking bracket 47, 48.

Figure 20:
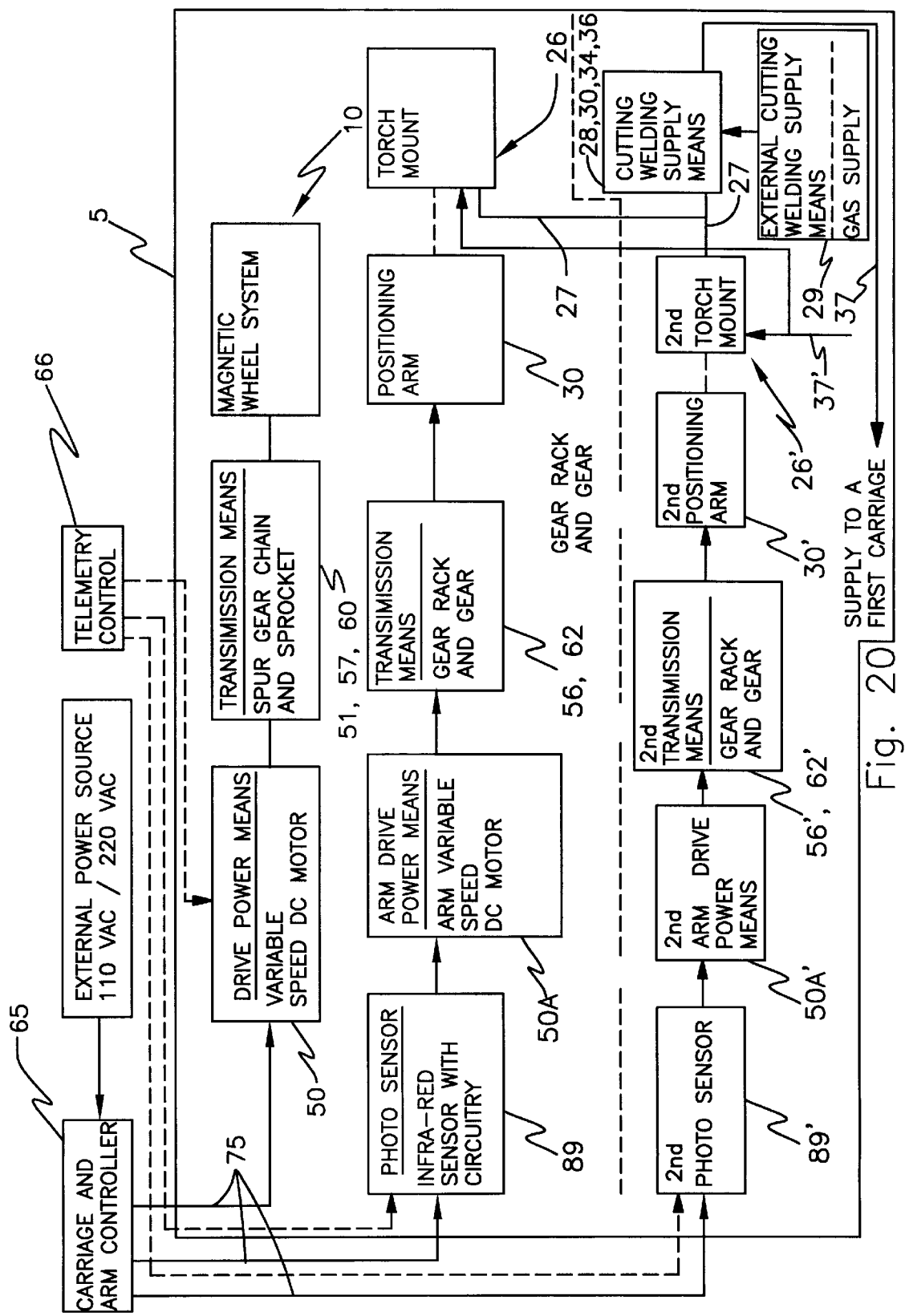
FIG. 20 is a schematic diagram depicting the magnetic wheel guided carriage with positioning arm bearing a plurality of automated positioning arms. Additionally illustrated is the ability of the invention to transport cutting and or welding means to be supplied to a first unit of the invention in the form, for example, of wire feed.

Supply means are affixed or supplied to the carriage frame 5 or a supplemental carriage to provide cutting and/or welding materials provided, for example, as illustrated in FIGS. 1, 2, 3, 4, 6, 9, 13, 17 and 20, by a hose, gas supply, or welding supply such as wire feed 27, 29, 30 gas fitting, valve and manifold means depicted, for example, in FIGS. 4, 5, 9, 13, and 17, 19, 20 as gas fitting, gas flow control valve, gas manifold and wire feed 28, 34, 36, 30. A cutting and/or welding supply, such as, for example, wire feed 30 or other cutting and or welding supply means, from a supplemental carriage to a first carriage is indicated by FIG. 20 showing a cutting and/or welding supply means output 37 to a first carriage and a cutting and/or welding supply means input 37' to a torch mount 26, 26'. Means are not generally illustrated for other cutting or welding processes but may readily be adapted to the invention as disclosed.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:
1. A magnetic wheel guided carriage with positioning arm comprising:
   A. a carriage; a magnetic wheel system affixed to the carriage by mounting means; the magnetic wheel system having magnetic wheel means oriented to rotate approximately in the same or parallel planes; each magnetic wheel means generally in contact with a surface upon which the invention is to travel;
   B. drive power and transmission means for the magnetic wheel system affixed by mounting means to the carriage and interrelated to the magnetic wheel system to rotate the magnetic wheel means; the magnetic wheel system to propel the carriage along a direction of a carriage travel;

C. a positioning arm affixed to the carriage by mounting means and having an arm; the arm having an arm longitudinal axis generally orthogonal to the direction of carriage travel; one or a plurality of bracket means disposed on the arm; remote control means for control of the magnetic wheel system; cutting and/or welding supply means disposed on the carriage.

2. A magnetic wheel guided carriage with positioning arm according to claim 1 wherein;

A. the magnetic wheel means are composed of magnetic wheels; the magnetic wheel system is composed of at least two sets of magnetic wheels; a first set of magnetic wheels having at least one magnetic wheel; a second set of magnetic wheels having two or a plurality of magnetic wheels interconnected with an axle; the surface to be traveled is ferrous plate or pipe; at least one magnetic wheel aligned with a scribed reference line on the surface to be traveled; the magnetic wheel system causing the invention to track along the scribed reference line;

B. drive power and transmission means, for the magnetic wheel system, provided by an electrical motor, and spur gear, chain and sprocket; remote control means for control of the magnetic wheel system provided by a carriage and arm controller connected by electrical and/or control cables or telemetry via connection means;

C. the arm formed of generally tubular metal; positioning arm mounting means provided by an arm mounting unit affixed to the carriage and securing the positioning arm composed of an arm guide, finger nuts, stud and locking nut; locking means to secure the arm in a fixed position; bearing means, secured to the carriage and connected to the arm, may facilitate the extension and retraction movement of the arm; the bracket means disposed on the arm receiving cutting and/or welding means positioned generally outside the path of travel; cutting and/or welding supply means comprised of gas fitting, valve and manifold means; means to supply and receive cutting and/or welding supply means to and/or from a separate apparatus of this invention.

3. The invention according to claim 2 wherein:

A. the electrical motor is a variable speed DC motor;

B. the cutting or welding means received by the bracket means is at least one torch mount comprised of a torch arm workpiece adaptor bearing a torch; supply means of cutting and/or welding materials comprising gas fitting, gas flow control valve, gas manifold and gas hoses and welding supply means input and output for such cutting and or welding materials; operation of the cutting and or welding process creating a torch flame; heat shield means intermediate the torch flame and the magnetic wheels proximate the torch flame;

C. connection means provided by a data and control connection;

D. bearing means for the arm provided as a guide block and ball bearing.

4. The invention according to claim 3 wherein:

A. one or a plurality of cutting and/or welding means are received by one or a plurality of torch mounts and 2nd torch mounts;

B. heat shield means is a steel disk affixed to the magnetic wheel proximate the torch flame.

5. The invention according to claim 2 wherein:

A. the magnetic wheel system is composed of two sets of three magnetic wheels with each set of magnetic wheels interconnected with a spring steel axle; at least one of the magnetic wheel sets is adjustable via bolts and wheel alignment adjustment slots.

6. The invention according to claim 2 wherein:

A. the magnetic wheel system is composed of two sets of two magnetic wheels with each set of magnetic wheels interconnected with a spring steel axle; at least one of the magnetic wheel sets is adjustable via bolts and wheel alignment adjustment slots.

7. The invention according to claim 2 wherein:

A. the magnetic wheels are composed of one or a plurality of magnetic means interleaved with one or a plurality of washer means.

8. The invention according to claim 7 wherein:

A. magnetic means are magnetic disks having a central bore; washer means are mild steel plate wheel washers having a central bore and having an O.D. greater the O.D. of the magnetic disks; wheel washers and magnetic disks are interleaved with respective central bores aligned and receiving a sleeve having a sleeve bore to receive an axle; magnetic disks and wheel washers fixed in placed with means including epoxy and welding; wheel washers are machined to a generally circular shape with the machine tolerance dictating, in part, the precision of the tracking of the magnetic wheel system along the scribed reference line.

9. A magnetic wheel guided carriage with positioning arm comprising:

A. a carriage; a magnetic wheel system affixed to the carriage by mounting means; the magnetic wheel system having magnetic wheel means oriented to rotate approximately in the same or parallel planes; each magnetic wheel means generally in contact with a surface upon which the invention is to travel;

B. drive power and transmission means for the magnetic wheel system affixed by mounting means to the carriage and interrelated to the magnetic wheel system to rotate the magnetic wheel means; the magnetic wheel system to propel the carriage along a direction of carriage travel;

C. a positioning arm affixed to the carriage by mounting means having an arm; the arm having an arm longitudinal axis generally orthogonal to the direction of carriage travel; arm drive power and transmission means affixed to the carriage and interrelated to the arm for arm extension and retraction; one or a plurality of bracket means disposed on the arm; remote control means for control of the magnetic wheel system and positioning arm; cutting and/or welding supply means disposed on the carriage.

10. The invention according to claim 9 wherein:

A. the magnetic wheel means are composed of magnetic wheels; the magnetic wheel system is composed of at least two sets of magnetic wheels; a first set of magnetic wheels having at least one magnetic wheel; a second set of magnetic wheels having two or a plurality of magnetic wheels interconnected with an axle; the surface to be traveled is ferrous plate or pipe; at least one magnetic wheel aligned with a scribed reference line on the surface to be traveled; the magnetic wheel system causing the invention to track along the scribed reference line;

B. drive power and transmission means, for the magnetic wheel system, provided by an electrical motor, and spur gear, chain and sprocket; arm drive power and transmission means provided by an electrical motor, and gear rack and gear;

C. the arm formed of generally tubular metal; positioning arm mounting means provided by an arm mounting unit affixed to the carriage and securing the positioning arm composed of an arm guide, finger nuts, stud and locking nut; bearing means, secured to the carriage and connected to the arm, may facilitate the extension and retraction movement of the arm; arm drive power and transmission means affixed to the carriage and interrelated to the arm for arm extension and retraction; remote control means for control of the magnetic wheel system and positioning arm provided by a carriage and arm controller connected by electrical and/or control cables or telemetry via connection means; the bracket means disposed on the arm to receive cutting and/or welding means which are positioned generally outside the path of travel to perform cutting and/or welding processes; cutting and/or welding supply means comprised of cutting and/or welding materials; means to supply cutting and/or welding supply means to a separate apparatus of this invention.

11. The invention according to claim 10 wherein:

A. the electrical motor is a variable speed DC motor;

B. the cutting or welding means received by the bracket means is at least one torch mount comprised of a torch arm workpiece adaptor bearing a torch; supply means of cutting and/or welding materials comprising gas fitting, gas flow control valve, gas manifold and gas hose and welding supply means input and output for such cutting and/or welding materials; operation of the cutting and/or welding process creating a torch flame; heat shield means intermediate the torch flame and the magnetic wheels proximate the torch flame;

C. arm drive power means composed of arm variable speed DC motor; connection means provided by a data and control connection; bearing means provided as a guide block and ball bearing.

12. The invention according to claim 11 wherein:

A. one or a plurality of cutting and/or welding means are received by one or a plurality of torch mounts and 2nd torch mounts;

B. heat shield means is a steel disk affixed to the magnetic wheel proximate the torch flame.

13. The invention according to claim 10 wherein:

A. the magnetic wheel system is composed of two sets of three magnetic wheels with each set of magnetic wheels interconnected with a spring steel axle; at least one of the magnetic wheel sets is adjustable via bolts and wheel alignment adjustment slots.

14. The invention according to claim 10 wherein:

A. the magnetic wheel system is composed of two sets of two magnetic wheels with each set of magnetic wheels interconnected with a spring steel axle; at least one of the magnetic wheel sets is adjustable via bolts and wheel alignment adjustment slots.

15. The invention according to claim 10 wherein:

A. the magnetic wheels are composed of one or a plurality of magnetic means interleaved with one or a plurality of washer means.

16. The invention according to claim 15 wherein:

A. magnetic means are magnetic disks having a central bore; washer means are mild steel plate wheel washers having a central bore and having an O.D. greater than the O.D. of the magnetic disks; wheel washers and magnetic disks are interleaved respective central bores aligned and receiving a sleeve having a sleeve bore to receive an axle; magnetic disks and wheel washers fixed in placed with means including epoxy and welding; wheel washers are machined to a generally circular shape with the machine tolerance dictating, in part, the precision of the tracking of the magnetic wheel system along the scribed reference line.

17. The invention according to claim 10 wherein:

A. position sensor means affixed to arm and electrically interconnected with arm drive power means; guidance means applied to the surface to define the pattern for cutting and/or welding; the position sensor to scan guidance means to control movement of the arm to position cutting or welding head by control of the arm drive power means.

18. The invention according to claim 17 wherein:

A. the position sensor means is a photosensitive device with associated circuitry; guidance means is a guidance line provided by reflective tape.

19. The invention according to claim 18 wherein:

A. photosensitive device with associated circuitry is provided by an infra-red sensor with photo interlamp and circuitry.

20. A magnetic wheel guided carriage with positioning arm comprising:

A. a carriage; a magnetic wheel system affixed to the carriage by mounting means; the magnetic wheel system having magnetic wheel means oriented to rotate approximately in the same or parallel planes; each magnetic wheel means generally in contact with a surface upon which the invention is to travel;

B. drive power and transmission means for the magnetic wheel system affixed by mounting means to the carriage and interrelated to the magnetic wheel system to rotate the magnetic wheel means; at least one magnetic wheel means aligned with a scribed reference line on the surface to be traveled; the magnetic wheel system causing the invention to track along the scribed reference line along the path of travel;

C. one or a plurality of positioning arms affixed to the carriage by mounting means; each positioning arm having an arm; the arm having an arm longitudinal axis generally orthognal to the path of travel of the invention; each arm having arm drive power and transmission means affixed to the carriage and interrelated to the arm for arm extension and retraction; one or a plurality of bracket means disposed on each arm; remote control means for control of the magnetic wheel system and each positioning arm; cutting and or welding supply means disposed on the carriage.

21. The invention according to claim 20 wherein:

A. position sensor means affixed to each arm and electrically interconnected with the respective arm drive power means; the position sensor to scan a guidance line to control movement of the respective arm to position cutting or welding head by control of the respective arm drive power means.

22. A process using the apparatus of the invention of claim 17 comprising:

A. scribing a reference line for the purpose of positioning cutting and/or welding means to facilitate cutting and/or welding processes; positioning one or a plurality of magnetic wheel guided carriages, having cutting and/or welding means, such as wire feed, with positioning arms with respect to the reference line;

propelling the carriage on a ferrous surface; the cutting and/or welding means cutting or welding the ferrous material.

* * * * *